J. R. REYBURN & C. D. SAGENDORF.
CHAIN CONNECTOR DEVICE.
APPLICATION FILED NOV. 14, 1917.
1,296,219.
Patented Mar. 4, 1919.
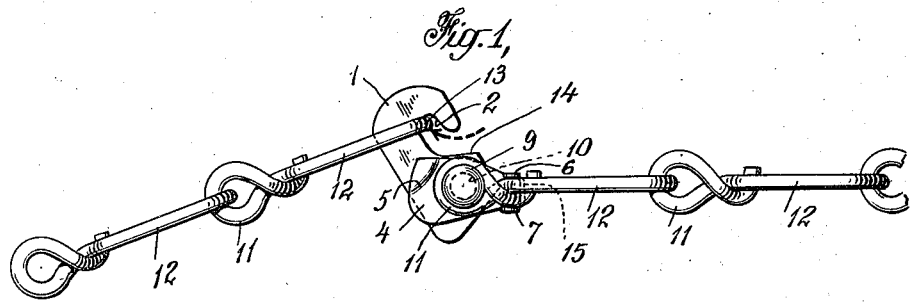
Fig. 1.
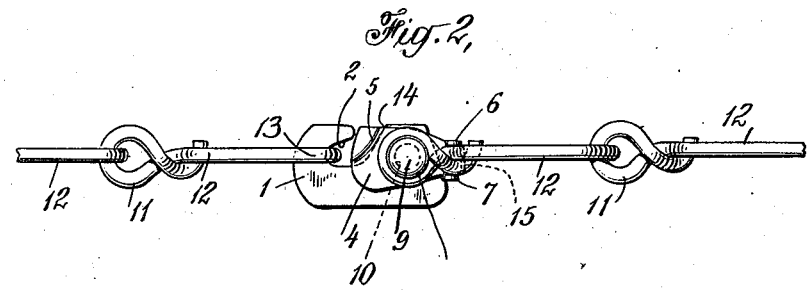
Fig. 2.
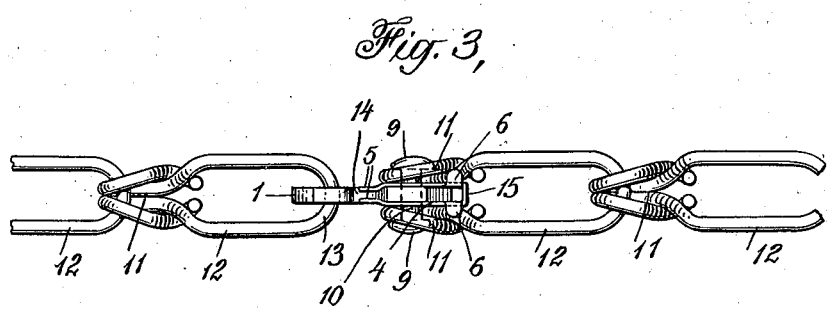
Fig. 3.
  
Fig. 4.  Fig. 5.  Fig. 6.
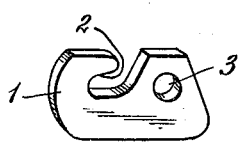 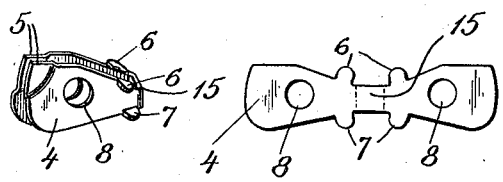
INVENTORS
John R. Reyburn and
Claude D. Sagendorf
BY
Harry L. Duncan
ATTORNEY

UNITED STATES PATENT OFFICE.

JOHN R. REYBURN, OF FAIRFIELD, AND CLAUDE D. SAGENDORF, OF BRIDGEPORT, CONNECTICUT, ASSIGNORS TO AMERICAN CHAIN COMPANY, INCORPORATED, OF BRIDGEPORT, CONNECTICUT, A CORPORATION OF NEW YORK.

CHAIN-CONNECTOR DEVICE.

1,296,219. Specification of Letters Patent. Patented Mar. 4, 1919.

Application filed November 14, 1917. Serial No. 202,016.

*To all whom it may concern:*

Be it known that we, JOHN R. REYBURN, of Fairfield, Fairfield county, Connecticut, and CLAUDE D. SAGENDORF, of Bridgeport, Fairfield county, Connecticut, have jointly made a certain new and useful Invention Relating to Chain-Connector Devices, of which the following is a specification, taken in connection with the accompanying drawing, which forms part of the same.

This invention relates especially to chain connector devices, such as may be used for detachably connecting the ends of the side chains of chain tire grips. The device may comprise a hook type connector member having one or more flat faces adjacent one end to which an end of the chain may be permanently connected, as for instance, by a securing stud or pin passing through this part of the connector and loosely securing the chain link thereto as by passing through the double eyes of the chain link where this style of chain is employed. The connector may be formed adjacent its other end with one or more connector recesses adapted to receive another link of the chain and a retainer device may be revolubly secured to the connector as by a securing stud or pin so that it may be moved across the opening in the connector recess to prevent accidental withdrawal of the link therefrom. This retainer may be manually or otherwise operated independently of the chain link in some cases, but it is advantageous to arrange for an operating connection between this retainer and the chain link secured to the connector member so that when the connector is swung down substantially into line with this link secured thereto the retainer substantially closes the recess and may be releasably held in this position as by a spring detent on the retainer engaging any suitable part of the connector.

In the accompanying drawing showing in a somewhat diagrammatic way illustrative embodiments of this invention, Figure 1 shows the operation of connecting the chain ends by such a connector.

Fig. 2 shows the parts in connected position.

Fig. 3 is a corresponding top view.

Fig. 4 is a view of the connector member separated from the other parts.

Fig. 5 is a similar view of a retainer member which may be used; and

Fig. 6 shows a form of blank from which this retainer member may be formed.

In the illustrative embodiment of this invention shown in the drawings, the connector may have one or more flat faces adjacent the part which may be permanently secured to one end of the chain and if desired the connector 1 may be stamped or otherwise formed from heavy sheet steel or other metal so as to secure flat faces at this point adjacent the pivot aperture 3 and also ample rigidity in the hook end of the connector which may be produced by forming a suitable connector recess 2 in this member, as shown in Figs. 1 and 4. Where a double eye link chain is used one end of the chain may be conveniently secured to the connector by a securing stud or pin 10 passing through the double eye of one of the chain links and having riveted or other heads 9 on either side of the link so as to permanently secure the chain thereto while allowing the angular movement of the connector around this securing pin. This pin may also serve to mount one or more retainer members or plates in proper coöperation with the connector as by having them revolubly or swingingly mounted thereon so that they may extend substantially across the connector recess to prevent withdrawal of a chain link therefrom. A plate retainer, such as 4, formed of relatively light sheet metal may be provided on one or both sides of the connector and preferably arranged to have operative attachment or connection with the adjacent permanently secured chain link so that the swinging movement of this link with respect to the connector automatically moves the retainer across the connector recess. In some cases it is advantageous to have a retainer member on both sides of the connector and in this connection the retainer may be of generally U-shaped outline so that the two retainer portions or members are connected as by the integral retainer yoke 15 shown in Figs. 1 and 3 so that the retaining device on each side of the connector moves in unison. Suitable operating attachment devices or lugs 6, 7, may be arranged on the retainer so as to be secured or interlocked with the adjacent chain link 12 to insure the desired operating connection between these parts.

As indicated in Fig. 1 the connector when swung up into the angular position indicated effects the withdrawal of the retainer from the connector recess 2 and under these conditions a loop 13 of any one of the links at the free end of the chain may be inserted in the connector recess as indicated by the dotted arrow and any substantial pull on this link swings the connector down substantially into line with the link 12 permanently secured to the other end of the connector. This action through the operative attachment of the retainer to the adjacent link swings the retainer up into some such position as indicated in Fig. 2 in which the connector recess is largely or substantially closed and withdrawal of the link end 13 is thereby prevented. If desired, the retainer may be releasably held in this closed position by forming thereon suitable spring detents such as 5, which are adapted to coöperate with any suitable abutment or portion on the connector, such as the abutment 14, forming the rearward face of the connector recess, for example. These detents prevent the accidental releasing of the connecting device even if the tension on the adjacent parts of the chain is momentarily released, although it is, of course, understood that so long as there is any substantial tension in the chain holding the links on either side of the connector substantially in line the connecting device is held in its closed position. At the same time it may, of course, be readily and instantly released by pushing up the link end 13 which swings the hook connector 1 away from the retainer so that the link may be released.

The retainer may be readily formed or stamped up out of resilient steel or other suitable material as by stamping up a blank of substantially the contour shown in Fig. 6 and the bending the parts into generally U-form as shown in Fig. 5, so that the two holes 8 for the securing pin are brought substantially into line, the detent members 5 being offset or forced inward to the desired extent at any suitable stage of the forming operation, the attachment lugs 6 and 7, being also preferably offset or bent into upstanding position before the connector device is fully assembled, although this is not of course necessary in all cases. The retainer may then be slipped over the hook connector and the double eyes 11 of one of the links of the chain put in place and the securing stud inserted and its end headed over in any suitable way so as to permanently secure all these parts together while still allowing sufficient freedom of movement so that the connector can swing up into releasing position when required.

This invention has been described in connection with a number of illustrative embodiments, forms, proportions, materials, devices and methods of manufacture and use, to the details of which disclosure the invention is not of course to be limited, since what is claimed as new and what is desired to be secured by Letters Patent is set forth in the appended claims.

We claim—

1. The connector device adapted to detachably connect the ends of the side chains of a chain tire grip and which comprises a connector having flat faces adjacent one end and a connector recess adjacent its other end, a securing stud engaging said connector and permanently securing adjacent the flat faces thereof the double eye end of a side chain link so that said connector can have swinging movement with respect thereto, a sheet metal retainer having securing holes through which said securing stud passes to mount said retainer adjacent the flat side of said connector, operating attaching lugs on said retainer and coöperating with the chain link secured to said connector so that said link and retainer move substantially in unison to swing said retainer substantially across said connector recess and spring detents formed in said retainer to releasably hold the same in closed position.

2. The connector device adapted to detachably connect the ends of a chain and which comprises a connector having a connector recess adjacent its end, a securing pin engaging said connector and adapted to secure a double eye chain link thereto, a U-shaped sheet metal retainer mounted on said securing pin, and an operating connection formed on said retainer to engage the chain link secured to said connector so that said link is adapted to move said retainer to automatically swing said retainer substantially across said connector recess when the chain ends united by said connector are placed under strain.

3. The connector device adapted to detachably connect the ends of a chain and which comprises a connector having a connector recess, a retainer pivotally mounted on said connector, and an operating connection formed on said retainer and adapted to engage a chain link secured to said connector so that said link is adapted to move said retainer to automatically swing said retainer substantially across said connector recess when the chain ends united by said connector are placed under strain.

JOHN R. REYBURN.

Witnesses:
STEWART J. TURP,
KATHERINE T. FENNESSY.

CLAUDE D. SAGENDORF.

Witnesses:
EDWARD H. LAWLER,
CHARLES H. EDDY.